No. 678,293. Patented July 9, 1901.
C. S. CLARK.
NUT LOCK.
(Application filed June 14, 1900. Renewed May 28, 1901.)
(No Model.)
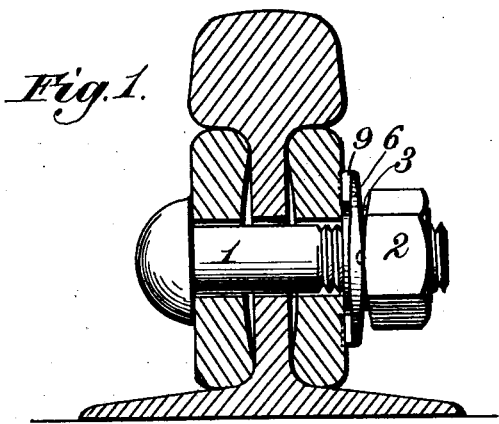
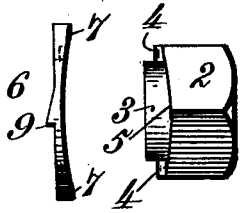
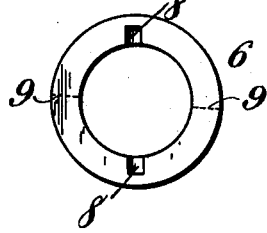
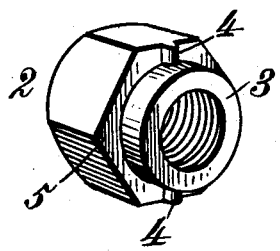
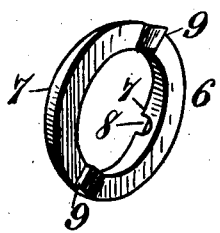
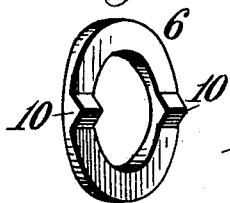
Witnesses
Robert Ewitt
H. B. Keefer
Inventor
Cornelius S. Clark.
By James L. Norris
Atty

UNITED STATES PATENT OFFICE.

CORNELIUS S. CLARK, OF NORFOLK, VIRGINIA, ASSIGNOR OF THREE-EIGHTHS TO CHARLES M. BARNETT, OF SAME PLACE.

NUT-LOCK.

SPECIFICATION forming part of Letters Patent No. 678,293, dated July 9, 1901.

Application filed June 14, 1900. Renewed May 28, 1901. Serial No. 62,298. (No model.)

*To all whom it may concern:*

Be it known that I, CORNELIUS S. CLARK, a citizen of the United States, residing at Norfolk, in the county of Norfolk and State of Virginia, have invented new and useful Improvements in Nut-Locks, of which the following is a specification.

My present invention relates to certain new and useful improvements in nut-locks, and has for its object to provide a device of this character that will be simple in construction, easy of application, and positive and effective in its action.

Briefly stated, the invention comprises a nut and a coöperating yieldable washer provided with means for temporarily locking the same to the nut, so that these parts will turn together, said washer being provided with oppositely-disposed bearing-faces and oppositely-disposed engaging faces or projections that are arranged at right angles to the bearing-faces for the purpose hereinafter described.

In order to enable others to make and use my said invention, I will proceed to describe the same in detail, reference being had for this purpose to the accompanying drawings, wherein—

Figure 1 is a sectional view of a railroad-rail and fish-plates, showing my improved nut-lock applied thereto. Fig. 2 is a side view of my improved nut and washer shown detached from the bolt. Fig. 3 is a face view of the washer. Fig. 4 is a perspective view of the nut. Fig. 5 is a perspective view of the washer, and Fig. 6 is a slightly-modified form of washer.

In the accompanying drawings the reference-numeral 1 designates a bolt of ordinary construction, on the threaded end of which my improved form of nut and washer are applied. The nut 2 is provided on its inner end or face with a tubular projection 3, the end of which constitutes the bearing-face of the nut, and with oppositely-disposed teats or lugs 4, as shown, the two sides of the base proper of the nut at right angles to the said teats or lugs 4 being formed with depressions 5, as more clearly shown in Fig. 2.

The reference-numeral 6 indicates my improved washer, which constitutes an important feature of the invention, said washer being of ring form and provided on one face with oppositely-disposed thickened portions 7, constituting bearing-faces, in which are formed seats or depressions 8, corresponding in shape to the teats or lugs 4 on the nut and into which said teats or lugs fit, whereby when the said ring or washer is placed upon the tubular projection 3 on the nut the said teats or lugs and corresponding depressions will interlock with each other, so that upon the nut being turned upon the bolt the said washer will be caused to move or turn therewith. The opposite face of the washer is provided with oppositely-disposed toothed projections 9, constituting biting or engaging portions, which latter are arranged at right angles to the thickened portions 7 of the washer, and when the washer is in position upon the nut the said engaging portions 9 lie opposite the depressed portions 5 of the nut, thus allowing space or room for the washer to yield with a spring action on the two sides at right angles to the thickened or bearing faces 7 when the nut is being turned home upon the bolt. It will thus be seen that when the nut and washer are applied to a bolt the toothed engaging portions 9 will take or bite into the fish-plate with a slight yielding action, exerting a direct outward longitudinal pressure upon the nut, thus firmly and securely locking the same on the threaded portion of the bolt and preventing the same from turning thereon, it being understood that the washer is prevented from turning independent of the nut by the locking means heretofore described. The toothed engaging portions 9 of the washer instead of being formed with a single inclined face, as shown in Fig. 5, may be formed with two inclined or beveled faces 10, terminating in a biting end, as shown in Fig. 6, or may be otherwise formed, as desired, the object being to provide comparatively sharp engaging portions that will take or bite into the fish-plate or other structure to which the bolt is applied.

In use, as more clearly shown in Fig. 1, it will be observed that the outer end or face of the tubular projection of the nut will have a direct bearing against the face of the fish-plate, thus sustaining the strain, while the washer has a slight yielding action between the fish-plate and nut, the engaging portions 9 of the washer slightly entering the fish-plate or other base to prevent the nut from turning or working loose. If, however, it is desired to remove the nut from the bolt, the washer will yield sufficiently for this purpose at the two sides carrying the engaging portions to allow the nut to be turned backward, the depressed portions 5 of the nut allowing for the outward yield of the two sides of the washer to free the said engaging portions.

By the construction of nut and washer herein shown and described it will be seen that the inner end of the nut may be brought to bear directly against the fish-plate or other base to which the bolt is applied, thus enabling the parts to be firmly secured, the strain being sustained entirely by the nut, while the yieldable washer prevents the nut from turning backward or working loose.

What I claim, and desire to secure by Letters Patent, is—

1. A nut-lock, comprising a nut and a cooperating washer fitted over and carried by said nut, with means for locking these parts one to the other, whereby they may be rotated together, said washer being provided on one face with oppositely-disposed bearing portions and upon its other face with oppositely-disposed engaging portions, the latter being arranged at right angles to the bearing portions.

2. A nut-lock, comprising a nut and a yieldable washer fitted over an extension on one end of said nut, means intermediate the nut and washer for locking these parts one to the other to cause them to rotate together, said washer being provided at one face with oppositely-disposed bearing portions, and upon its opposite face with oppositely-disposed engaging projections.

3. A nut-lock, comprising a nut and a washer locked thereto, said nut being provided with a tubular projection constituting its bearing-face, and the washer fitted over said projection and provided on its inner face with oppositely-disposed bearing portions which lie adjacent to the inner face of the bolt, and on its outer face with oppositely-disposed engaging portions, the latter being arranged at right angles to the bearing portions.

4. A nut-lock, comprising a nut and a cooperating yieldable washer, said nut being provided on its inner end with a projection constituting its bearing-face and on which the washer is fitted, the said parts being provided with interlocking portions to hold them against independent rotation, and said washer having oppositely-disposed bearing projections on one face, and oppositely-disposed engaging projections on its opposite face, the latter being arranged at right angles to the bearing projections.

5. A nut-lock, comprising a nut and a cooperating yieldable washer, said nut being provided on its inner face with a tubular projection constituting its bearing end and with oppositely-arranged depressed portions, the washer fitting over and locked to the projection on the nut whereby these parts may be moved together, and provided on one face with oppositely-disposed bearing portions and on its other face with oppositely-disposed engaging projections, the latter being arranged directly opposite to the depressed portions of the nut when the parts are in position upon a bolt.

6. A nut-lock, comprising a nut and a cooperating yieldable washer carried thereby, with means for locking these parts one to the other to cause them to rotate together, said washer being provided with oppositely-disposed thickened portions constituting bearing-faces on one side thereof, and toothed projections upon the opposite side of the washer arranged at right angles to the said bearing-faces, substantially as described.

In testimony whereof I have hereunto set my hand in presence of two subscribing witnesses.

CORNELIUS S. CLARK.

Witnesses:
 GEO. W. REA,
 J. GRANVILLE MEYERS, Jr.